(12) United States Patent
Jensen et al.

(10) Patent No.: US 12,320,460 B2
(45) Date of Patent: Jun. 3, 2025

(54) PRESSURE LOCK FOR GAS LEAK DETECTION

(71) Applicant: Gasokay ApS, Allerød (DK)

(72) Inventors: Lasse Jensen, Horsens (DK); Søren Xerxes Frahm, Horsens (DK); Tom Lundquist, Hørsholm (DK); Peter Billy Jacobsen, Nærum (DK)

(73) Assignee: Gasokay ApS, Allerød (DK)

( * ) Notice: Subject to any disclaimer, the term of this patent is extended or adjusted under 35 U.S.C. 154(b) by 242 days.

(21) Appl. No.: 18/023,880

(22) PCT Filed: Sep. 3, 2021

(86) PCT No.: PCT/DK2021/050272
§ 371 (c)(1),
(2) Date: Feb. 28, 2023

(87) PCT Pub. No.: WO2022/048723
PCT Pub. Date: Mar. 10, 2022

(65) Prior Publication Data
US 2023/0313931 A1   Oct. 5, 2023

(30) Foreign Application Priority Data
Sep. 4, 2020   (DK) .......................... PA 2020 70571

(51) Int. Cl.
*F16L 55/10*   (2006.01)
*G01M 3/08*   (2006.01)
*G01M 3/28*   (2006.01)

(52) U.S. Cl.
CPC ............... *F16L 55/10* (2013.01); *G01M 3/08* (2013.01); *G01M 3/2815* (2013.01)

(58) Field of Classification Search
CPC ............... F16L 55/10; G01M 3/00–08; G01M 3/26–28; G01M 3/2815
See application file for complete search history.

(56) References Cited

U.S. PATENT DOCUMENTS 3,583,435 A * 6/1971 Stewart ..................... F17D 5/02
                                                              137/551
4,068,522 A * 1/1978 Poe ......................... G01M 3/08
                                                              73/40.5 R (Continued)

FOREIGN PATENT DOCUMENTS

DE          2700366 B2     2/1979
GB           835231 A      5/1960
(Continued)

OTHER PUBLICATIONS

International Search Report and Written Opinion for PCT/DK2021/050272, dated Nov. 22, 2022, 7 pages.

*Primary Examiner* — Nguyen Q. Ha
(74) *Attorney, Agent, or Firm* — Luedeka Neely, P.C.

(57) ABSTRACT

A pressure lock for a gas system with a regulator, the pressure lock comprises a pressure lock body to be fluidically connected in said gas system, whereby gas can pass from a chamber in the body via lock connection means to the gas system and activation means for delivering gas from said pressure lock body and into the gas system thereby providing a lock-up pressure, whereby the gas from said pressure lock body provides an increased pressure in the gas system, whereby the regulator is blocked for a short period of time thus allowing the detection of leaks in the gas system downstream of the regulator.

16 Claims, 5 Drawing Sheets

(56) References Cited

U.S. PATENT DOCUMENTS

| | | | | | |
|---|---|---|---|---|---|
| 4,984,448 | A | * | 1/1991 | Jordan | G01M 3/02 |
| | | | | | 73/40.5 R |
| 5,269,171 | A | * | 12/1993 | Boyer | G01M 3/2807 |
| | | | | | 73/40.5 R |
| 2011/0284500 | A1 | | 11/2011 | Rappl et al. | |

FOREIGN PATENT DOCUMENTS

| | | | | | |
|---|---|---|---|---|---|
| GB | 2158591 | A | | 11/1985 | |
| IE | 46051 | B1 | * | 2/1983 | G01M 2/02 |
| WO | 2009031902 | A1 | | 3/2009 | |
| WO | 2009049381 | A1 | | 4/2009 | |

* cited by examiner

PRESSURE LOCK FOR GAS LEAK DETECTION

FIELD OF THE INVENTION

The invention relates to the field of detecting leaks in gas lines. Specifically, it relates to fast gas leak detection and detectors for quick detection.

BACKGROUND OF THE INVENTION

Gas burners are used for numerous applications including heating and cooking in places, where a steady supply of electricity cannot be ensured. This may be for outdoors grilling, on boats out at sea, at cottages far from cities or in areas, where the electricity supply is not steady, and the power may cut frequently. Some people also have a general preference to cooking with gas.

The fact that gas is flammable is what makes it perfect for stove top cooking, but it also poses a danger to the users, as leaking obviously causes risk of uncontrolled fire and even explosions, if significant volumes of gas build up. Leaks might happen because of errors in assembly of the gas system, e.g. where a tube is connected to an outlet. Another cause of leaking is the tube itself becoming damaged which can happen because it degrades over time, especially extreme temperatures, sunlight, and ozone can damage the tube, e.g. if it is outdoors in frost or if cooking grease drips on the tube thus heating it locally. Leaks cause thousands of serious accidents yearly which result in fatalities in the worst cases.

Because of the risks involved, detecting whether leaks are present in the system is essential for using gas safely, e.g. for cooking or heating. Various solutions exist for detecting the presence of leaks in a system. One such solution is to have a manometer integrated with the regulator, but such a solution cannot be retrofitted in a system which makes the solution costly and may discourage users from implementing the necessary safety precautions. Furthermore, some users may not feel comfortable evaluating the readings of a manometer to determine whether the gas system is sufficiently leak-tight. Furthermore, the detection time becomes an important aspect of leak detection. The regulator in a gas system will attempt to maintain a fixed output pressure by compensating if a leak is present. Hence, accurate leak detection based on the pressure loss caused by a leak cannot be performed, until the pressure upstream and downstream of the regulator has equalised. Because the time before a leak detection can be made can sometimes be up to half an hour and there is no clear indication of the system being ready for leak detection, there is a risk that the user will draw conclusions on the system too soon. Especially in the case where gas detection is based on detecting a pressure drop, and the pressure will not drop until any excess pressure has dwindled, this may lead to the user drawing the faulty conclusion that there is no leak because they evaluated it too soon. In such a case, the user will get a false sense of security because they miss the signs of a leak in the system.

In addition, the long measurement time might discourage some users from frequently testing the system for the presence of leaks. The more cumbersome it is for the user to use the safety mechanisms, the higher the risk that they will not do it every time, and thus accidents, which could have been avoided, might take place.

SUMMARY OF THE INVENTION

In accordance with the invention, some of the above-mentioned difficulties with gas leak detection will be alleviated by a pressure lock for a gas system with a regulator, this pressure lock comprising . . . a pressure lock body to be fluidically connected in the gas system, whereby gas can pass from a lock chamber in the pressure lock body via lock connection means to the gas system, activation means for delivering gas from said pressure lock chamber and into said gas system thereby providing a lock-up pressure, whereby the gas from said pressure lock body provides an increased pressure in said gas system.

A pressure lock is a means for blocking the flow of gas through the regulator in a gas system temporarily. By blocking the inflow of gas, the pressure lock ensures that the pressure is the same everywhere between the regulator and the gas consumer of the gas system, if there is no leak in the system. If there is a leak in the system, the pressure lock will still block the flow of gas through the regulator temporarily, but a pressure difference will persist between the sides of the gas system due to the leak. The pressure lock functions by compressing a volume of the gas in the gas system and thereby increasing the pressure to above the predetermined output pressure thereby stopping the regulator from introducing more of the supply gas into the system, until the pressure has decreased to the output pressure once more, as the regulator will close the access to the gas supply, when the predetermined output pressure is exceeded. Thus, the pressure lock requires a pressure lock body connected to the gas system by a lock connection means, such that a volume of the gas of the system can enter the pressure lock body. The pressure lock further comprises activation means that allows the compression of the volume of gas within the pressure lock body and thereby increasing the pressure in the gas system temporarily. The amount of gas compressed by the pressure lock and therethrough the rise of the pressure brought on by the pressure lock may vary between different variants of the invention.

The pressure lock allows rapid detection of a leak in the gas system to take place. If no pressure lock is present, the regulator will work to maintain a predetermined output pressure downstream of the regulator. Even when the gas supply is shut off, an elevated pressure will remain upstream of the regulator for some time, and the regulator will continue to uphold the predetermined output pressure in the gas system. If there is no pressure lock in the gas system, it will not be possible to detect a leak on the supply side of the gas system before the pressure upstream and downstream of the regulator has equalised. Depending on the gas system, this may take several minutes and up to half an hour. If there is no leak in the system, the user making the leak test will observe no difference between the situation, where the regulator is ensuring a stable pressure, and when the test is made. If there is a leak, the user will see a change, once the system has equalised and is ready for the detection reading to be made. Thus, there is a risk of a user not waiting long enough and drawing the wrong conclusion that there is no leak in the system. This poses the danger of a false sense of security. Similarly, a longer waiting time in relation to a leak test may mean that the user being in a hurry will sometimes forego making the leak test, thus making the gas system less secure. Hence, implementing a pressure lock, which allows the user to make a rapid leak test, where the results can be seen within less than a minute, increases the security of the system. Furthermore, the user will be more likely to conduct frequent leak tests, when each test does not take long to conduct.

Further, the pressure lock has the benefit of being easy to incorporate into an existing gas system, as the lock connection means may be any type of connector that allows the gas to pass through the pressure lock body from one side to the other such that the gas system stays fluidically connected through the pressure lock body. In some variants of the invention, the lock connection means may be intended to connect directly to the tubing of the gas system. In other variants, the lock connection means may be adapted to connect to other connection means of the gas system, e.g. directly to the connection means of a manometer or leak detector or directly to the connection means at the output of the regulator or the connection means at the input of the gas consumer.

In an embodiment of the invention, the activation means is a piston driven by the pressure lock activator.

By having a piston compression system in the pressure lock, the operation can be made simple for the user and can be driven manually by a user pressing down on the pressure lock activator and thus on the piston, thereby compressing the gas manually. Being able to activate the pressure lock manually is particularly important, when the pressure lock is operated in remote locations, where access to electricity or propellants may be limited. Furthermore, manual piston compression is a well-known principle requiring only few components and may thus be produced cheaply.

In an embodiment of the invention, the pressure lock is integrated with a gas leak detector, thereby ensuring rapid detection of a gas leak.

By integrating the pressure lock with a gas leak detector, it is only necessary to incorporate a single component into the gas system to ensure rapid leak detection. This makes it easier for the user to install it in the gas system. Furthermore, the integration of the pressure lock, which must be activated, and the gas leak detector ensures that the user is close to the gas leak detector in the span of time, where the regulator is blocked and a leak will be detectable. This helps ensure that the user is present and does not miss a reading.

In an embodiment of the invention, a pressure lock is integrated with a gas leak detector, wherein said gas leak detector is a directional gas leak detector comprising:
  at least a first chamber and a second chamber for holding liquid, and
  a first chamber connector providing a passage to said first chamber and
  a second chamber connector providing a passage to said second chamber,
  wherein said first and second chambers are connected by a gas bridge.

By having at least two chambers in the directional gas leak detector, it becomes possible to detect on which side of the directional gas leak detector a leak is present. When the gas leak detector is installed for use in a gas system each of the first and second chambers is partially filled with a liquid such as water. If a leak is present in the system, the water levels in the two chambers will change due to the differential pressure, and bubbles will form. The bubbles will move in the direction D towards the side, where the leak is. Thus, the bubbles become a clear visual indicator that can be determined by any user without any special training.

By indicating on which side of the system the leak is, e.g. the consumption side or the supply side, it becomes easier for the user to locate the problem and deal with it. The leak may be caused by a fault in the connection between a conduit and any of the other components, i.e. the regulator, the burner or the gas supply. Indicating on which side the leak is, allows the user to examine only the connections on the relevant side thus making it faster and easier to solve the problem. In the case, where the leak is caused by damage to the conduit, knowing whether it is on the supply side in the supply conduit or on the consumption side in the consumption conduit also allows the user to examine a shorter conduit section to find the leak.

If there is no leak, no bubbles will form, and the user will know that it is safe to proceed with using the gas system.

That the directional gas leak detector makes it possible to determine on which side of the directional gas leak detector itself the leak is located also means that the directional gas leak detector can be placed wherever it is most practical for the user. It may be placed at either end of the gas system, e.g. right before the burner to be as close as possible to where the user is going to be while using the gas system. Alternatively, it may be located at the middle to minimise the potential length of conduit to examine, or it may be located at any point along the line where it is easily accessible in the location where the gas system is installed thus making it easy to inspect whether bubbles are formed and how they move. By making the directional gas leak detector easily accessible and more user-friendly, the chances of the leak test being performed frequently is increased which in turn minimises the risk of a leak going undetected and causing an accident.

The directional gas leak detector may also benefit from having a window or region of transparent material in the first and second chambers of the directional gas leak detector which allows the user to inspect visually what is happening inside the first and second chambers. This is a means for allowing the user to see bubbles moving through the first and/or second chamber, thereby detecting a leak and its position relative to the directional gas leak detector.

By a window is understood any region made in a transparent material. In some variants of the invention, there may be only a single window in each of the first and second chambers. In another variant, there may be multiple windows, e.g. both in the sides and the bottom of the chambers. In yet another variant, the window may be the full size of the chamber such that all of either or both of the chambers are constructed in a transparent material, e.g. glass or a transparent plastic. In a variant of the invention, the first and second chambers may share a wall separating the two chambers. This wall may also comprise a window.

In an embodiment of the invention, the pressure lock is integrated with a directional gas leak detector comprising a first back-chamber and a first top opening connecting said first back-chamber to said first chamber, and wherein said directional gas leak detector further comprises a second back-chamber and a second top opening connecting said second back-chamber to said second chamber.

Having a first and second back chamber without any liquid present in addition to the first and second chambers with a liquid at the bottom has the benefit that gas may be led into the first side of the directional gas leak detector, i.e. the side of the first chamber and first back-chamber either from the top or from the bottom of the first back-chamber. Similarly, gas may be led into the second side of the directional gas leak detector, i.e. the side of the second chamber and second back-chamber either from the top or from the bottom of the second back-chamber. In the case, where the there is no first and second back-chambers, it is not possible to lead gas in from the bottom, as this would lead to the liquid getting into the chamber connector, but as there is no gas in the first and second back-chambers, the first and second chamber connectors can be connected to these from the bottom, respectively. The chamber connectors can also still be located at the top and will not be hindered by the first and second back-chambers.

Being able to locate the first and second chamber connectors freely at the top and/or bottom allows more flexibility in how the directional gas leak detector is located with respect to the gas system. This makes it possible to place it in a manner which is most convenient for the user in a specific location. It may be that it is easier to access the directional gas leak detector, if it is placed above or below the connectors, as it can thus be placed above or below a surface close to the gas system, between closely spaced cupboards, or within other restricted spaces, where it might not have been possible to have the first and second chamber connectors at the gravitational top of the directional gas leak detector.

In an embodiment of the invention, the pressure lock is integrated with a directional gas leak detector, wherein said directional gas leak detector comprises a bypass channel and a test activation means for engaging and disengaging said bypass channel, said test activation means being integrated with said pressure lock activator, whereby the bypass channel is disengaged simultaneously with the lock-up pressure being applied.

A bypass channel allows unobstructed gas flow through the gas system, while the directional gas leak detector and pressure lock is installed but not activated. Thus, a bypass channel ensures that the directional gas leak detector may be mounted permanently in the gas system and does not need to be plugged in every time a leak test is made. This makes it much easier and more practical for the user which in turn makes it more likely that a user will make frequent tests thereby increasing the safety of the use of the gas system. In some variants of the invention, the test activation means may be a button or a turn knob that the user can press to begin and/or end a test, i.e. toggle between test mode and bypass mode. In some variants of the invention, the test activation means will block the bypass channel and thus force any gas moving in the system to move through the first and second chambers and the gas bridge between them. In another variant of the invention, the test activation means may move the alignment of the directional gas leak detector, such that the gas flows through the chambers and gas bridge rather than through a bypass channel.

By integrating the pressure lock and the test activation, i.e. by introducing the lock-up pressure simultaneously with switching from bypass mode to test mode, the number of steps, which the user has to take to make a gas leak test, is reduced and the process simplified, thereby making it more likely that the user makes frequent gas leak tests. In a variant of the invention, the pressure lock is integrated with the test activation means in the form of a piston pump simultaneously applying the lock-up pressure and blocking the bypass channel, when the user presses it into position, thereby activating test mode and allowing immediate detection of the presence of leaks.

In a further embodiment, the pressure lock activator may be arranged integrally with the pressure lock activation means, such as when the pressure lock activator is in the form of a piston, and the pressure lock activation means is located at the base of said piston. Such an arrangement advantageously reduces the risk of the activation means not remaining level when being depressed or activated; by not being level, the seal is more likely to fail. Thus, by the activation means being integral to the activator, performance of the pressure lock is increased.

In a further embodiment, the pressure lock may comprise a lid and a resilient means, such as a spring. Said resilient means may advantageously displace the pressure lock activation means and lid back to a resting position after having been pushed down (to a depressed position).

Thus, the pressure lock activation means, pressure lock activator and lid may be in one of at least three positions, i.e., a depressed, testing position, a disengaged, resting position, and an extended, overpressure position.

In some embodiments, the lid is arranged to engage the pressure lock activator or the pressure lock activation means by engagement of a lid stopper in a track or groove, thereby advantageously ensuring a smooth transition of the pressure activator and/or activation means and lid from an depressed position to a resting or overpressure position. In one embodiment, said track or groove is comprised by the lid and the lid stopper is comprised by the pressure lock body.

In yet a further embodiment, the pressure lock of the invention may comprise a second resilient means, such as a snap element, arranged to engage with a lid stop for retaining the lid in an overpressure position. Said arrangement to engage a lid stop advantageously provides a mechanism for the lid to be retained in an overpressure position, which may serve as an indicator to the operator that pressure has fluctuated beyond the initial retaining force of the snap element in the resting position. Such an indication may queue the operator to inspect parts of the gas system, e.g., the regulator.

The invention further covers the method of temporarily blocking a regulator in a gas system comprising
  connecting a pressure lock to a gas system through a lock connection means, and
  ensuring that gas cannot exit the gas system through an active gas consumer, and
  engaging a pressure lock activator, whereby an activation means is activated, and a volume of gas inside a pressure lock body is compressed,
  whereby the pressure of the gas system is increased to a lock-up pressure exceeding a predetermined output pressure of the regulator.

For the pressure lock to function, the gas consumer must be shut off such that the gas is trapped, and the increased lock-up pressure is not lost through the outlet connected to the gas consumer, as the excess pressure would be lost too quickly to keep the regulator locked if the gas consumer is active.

However, it is not necessary to shut off the gas supply, as the lock-up pressure stops the gas from the gas supply from passing through the regulator. Stopping the flow of gas from the gas supply by supplying a lock-up pressure leads to immediate blocking of the gas supply rather than needing to wait for the equalisation of the pressure upstream and downstream of the regulator. Hence, it allows more rapid detection of a potential gas leak as the waiting time is decreased.

However, the pressure lock may still be useful after shutting off the gas supply, as an excess pressure will remain between the gas supply and the regulator for some time after the gas supply has been shut off. Hence, the pressure lock may be used to equalise the pressure after the regulator for a short period of time regardless of whether the gas supply has been shut off or not.

In an embodiment of the invention, gas leak detection takes place during the time in which the regulator is blocked.

Blocking the regulator leads to the equalisation of the pressure in the gas system downstream of the regulator, but this is only the case, if there is no leak in the system that allows the gas to escape and the pressure to dwindle. Hence, the time in which the regulator is blocked by the lock-up pressure created by the pressure lock is ideal for the detection of a gas leak, as it can be ensured that it will become apparent within a short time frame right after activation of the pressure lock. Having a known time in which to look for signs of a leak provides the user with confidence that they looked for a leak at the right time and that they did not miss the signs. Being able to rely on the detection process makes the user more comfortable using the gas system and makes it more likely that they will perform frequent leak tests thus making it even safer to use the gas system.

In an embodiment of the invention, a bypass channel is closed simultaneously with the activation of the pressure lock.

By including the bypass channel, the user does not need to reinstall the directional gas detection means in the system before each gas leak test is made, and they will not need to dismount it from the system, after the test is finished. With the presence of a bypass channel, many tests can be made, once the directional gas leak detector has been installed without needing to uninstall it again. Instead the user simply needs to engage the test activation means to close the bypass channel to begin a test.

By engaging the pressure lock and the test activation means simultaneously, the period of time in which a potential leak can be detected is maximised. The pressure lock will hold back the introduction of gas from the gas supply for a limited period of time, and therefore the simultaneous activation ensures that the user does not initiate the leak detection test too late to notice a potential leak. Simultaneous activation also ensures that the user does not need to spend unnecessary time on the test, as there is no need to first activate the test mode by engaging the test activation means to then subsequently activate the pressure lock before observing the results of the leak detection test on the directional gas leak detector. Hence, simultaneous activation of the test activation means and the pressure lock provides an efficient method of performing the gas leak detection.

In an embodiment of the invention, the method further comprises the step of directionally detecting a gas leak using a device.

By allowing both a quick detection of a potential gas leak and knowledge of the region of the gas system, in which the leak is located, ensures that the user can solve the leak problem as fast as possible so that the gas system can be taken safely into use again.

In a further embodiment, the method of temporarily blocking a regulator in a gas system includes the step of disengaging the pressure lock activator by disactivating a pressure activation means by means of a resilient means, such as a spring or compressed fluid. By disengaging the pressure lock activator, said activator is advantageously positioned to activate once more.

In a further embodiment, the method of temporarily blocking a regulator in a gas system includes the step of securing a position of the pressure lock activator by means of second resilient means. In one embodiment, said secured position is an extended, overpressure position, corresponding to a response to excessive pressure in the gas system. By securing said position, a transient state of overpressure in the system may be advantageously detected the operator, which may lead the operator to check, e.g., the regulator, and thereby increase safety.

SHORT LIST OF THE DRAWINGS

In the following, example embodiments are described according to the invention, where:

DETAILED DESCRIPTION OF DRAWINGS

In the following, the invention is described in detail through embodiments thereof that should not be thought of as limiting to the scope of the invention.

Like numbers are used for the same structures on all drawings. For clarity of the figures, not all features are marked with numbers on all figures, while the reference signs are still included in the description referring to other figures.

Figure 1:
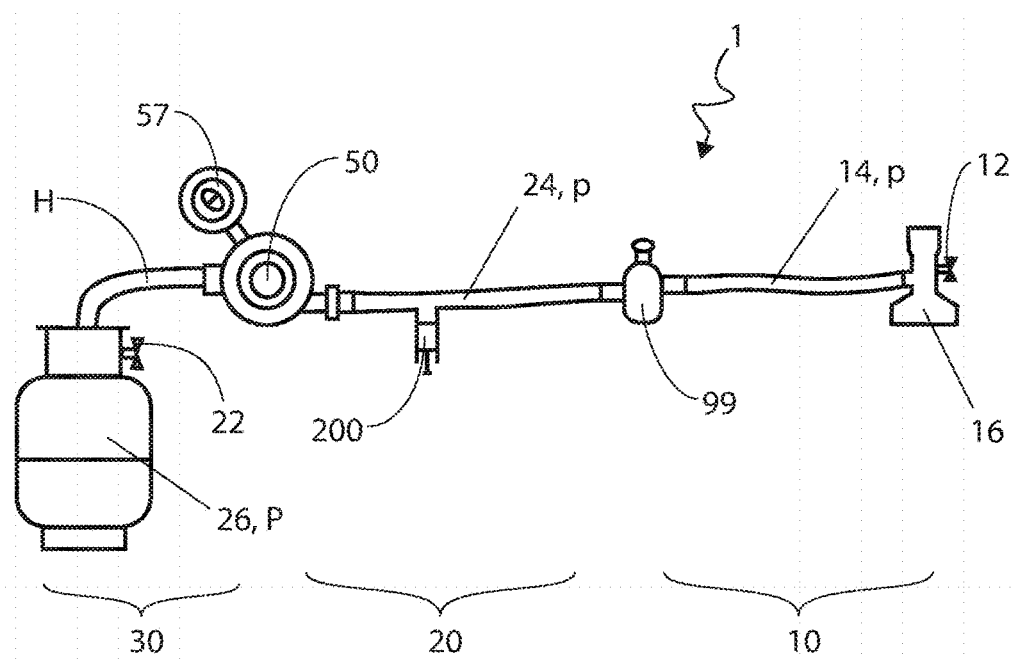
FIG. 1 is a sketch of a gas system with a gas leak detector.

FIG. 1 shows a gas system 1 comprising a gas supply 26, a regulator 50, a supply conduit 24, a pressure lock 200, a gas leak detector 99, a consumption conduit 14, and a gas consumer 16. The regulator 50 may come with a manometer 57, but this is an indicator and not a component necessary for the functionality of the gas system.

The fluid used in the gas system 1, is a fluid which will be a flammable gas at atmospheric pressure, e.g. butane, methane, biogas, propane or mixed gasses. In general, the system may rely on any type of flammable gas which can be transformed from liquid to vapour phase within the ambient temperature and atmospheric pressure, where the gas is being consumed by the end user. The general design of the gas system can be customised for different gasses depending on the properties of the gas and the pressures under which it is stored and used. Commonly, the gas supply 26 is either a central supply distributed to various households through piping structures or a gas cylinder, flask or gas tank closer to the location, where the gas will be consumed. The fuel for the gas system 1 is kept at a supply-pressure P being high enough to keep it in liquid phase thus allowing compact storage. The gas supply 26 may be placed a distance from where the gas is to be used. For instance, the gas supply 26 may be stored away outside a house, in a shed, in a storage compartment on a boat, or in the basement near other utilities and will frequently be a distance away from the gas consumer 16. The gas consumer 16 could be a burner on a stove top in a house or on a boat or it might be for a gas grill placed outdoors in a garden. Similarly, the gas system can be used for various applications, where energy consumption is required, such as but not limited to lighting, room heaters, patio heaters, indoor fire pits, soldering, welding and electricity generators. The person using the gas system will usually stay closer to the gas consumer 16 most of the time when operating the gas system 1 than they will to the gas supply 26.

The gas supply 26 may comprise a supply activation 22 which is a means for opening a path for gas to stream from the gas supply 26 and into the rest of the gas system 1. The supply activation 22 may for example be a valve that the user can open by turning a knob on the gas supply unit 26. Similarly, the gas consumer 16 may comprise a consumption activation 12, which may also be a valve, which the user can open by turning a knob. On a gas stove, it may for example have steps indicating how large a stream of gas is allowed through and may in some variants comprise an ignition for igniting the gas at the gas consumer 16.

Preferably, a gas leak detector 99 is placed between the regulator 50 and the gas consumer 16 although illustrated on a specific location in the gas system 1, it may be placed on either side of the pressure lock 200. The gas leak detector 99 may be of any type, e.g. a bubble detector or a manometer separate from the one integrated in the regulator. The necessary placement of the gas leak detector 99 depends on the type of gas detector, as some detectors will not be able to monitor the entirety of the system but only one side of the system relative to its own position, e.g. a common bubble detector can only detect leaks on the consumption side 10 of the system thus making it preferable to locate it as close to the regulator as possible.

The regulator 50 is mounted in the gas system 1 near the gas supply 26 and is a means to ensure that the rest of the gas system 1 receives a predefined output-pressure p of gas. The distance between the regulator 50 and the gas supply 26 may vary following national regulations, where the gas system is in use. Typically, they will be placed within 1 meter of each other but in some cases, they may also be further apart. In the gas supply 26, the fuel is stored under a high supply-pressure P. In embodiments, where the gas supply 26 is a gas cylinder or tank, the supply-pressure P in the gas supply 26 is usually around 0.3-16 bar. In embodiments of the gas system, where the gas is supplied through a pipeline from a central supply, the supply-pressure will commonly be in the range of 20-500 mbar. The output-pressure p of gas intended at the gas consumer 16 will typically be much lower than the supply-pressure P. In many embodiments, the output-pressure at the gas consumer 16 is in the range of 20-500 mbar, i.e. several orders of magnitude lower than the supply-pressure P of a gas cylinder or tank. The regulator 50 ensures that a pre-set output-pressure p is maintained downstream of the regulator 50, when it receives a higher pressure upstream. Depending on the specific application, the precision of the pressure output by the regulator 50 may vary.

The pressure lock 200 is a means of applying a lock-up pressure B to the regulator 50, thereby blocking the flow of gas into the system through the regulator 50. Hence, the pressure lock 200 may be placed anywhere downstream of the regulator 50.

Figure 2:
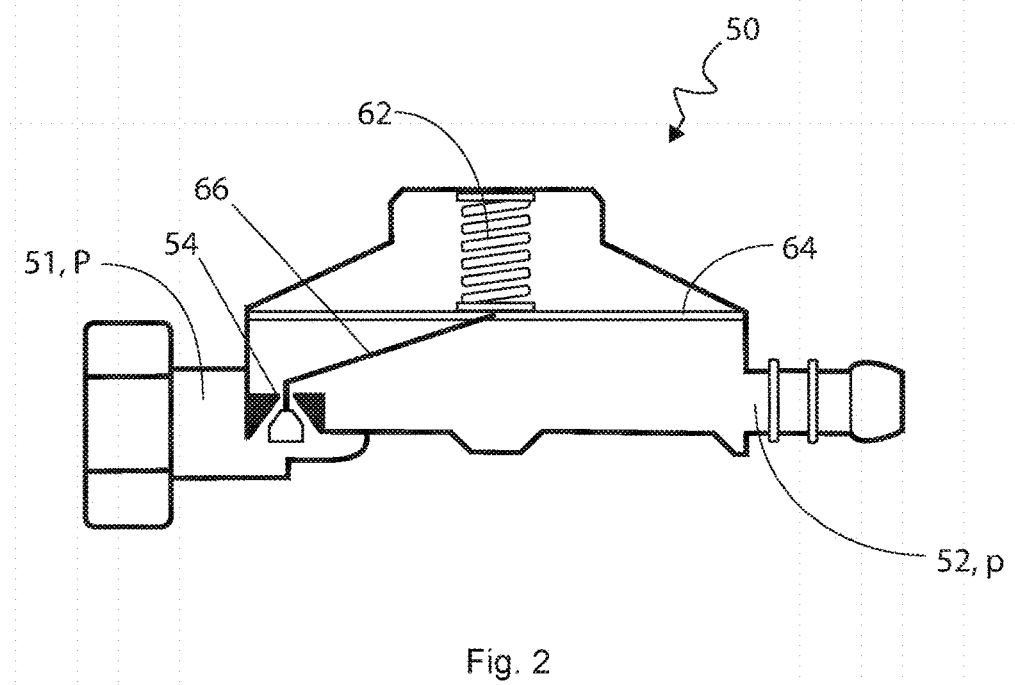
FIG. 2 is a sketch of a regulator shown in a cross-sectional view.

FIG. 2 shows a cross-sectional sketch of a regulator 50 illustrating the concept of a single-stage regulator known in the art. A regulator 50 comprises a regulator inlet 51 to be connected to a high-pressure side. In the gas system 1, the regulator inlet 51 is connected to the high-pressure region 30 (see FIG. 1), and it receives gas from the gas supply 26 (see FIG. 1). A regulator 50 further comprises a regulator outlet 52 which is where the regulator 50 releases gas at a lower pressure than it receives it at the regulator inlet 51. In the gas system 1, the regulator outlet 52 is connected to the supply side 20 (see FIG. 1). The regulator inlet 51 and the regulator outlet 52 are connected through a regulator opening 54 which is at least partially blocked by a blocking lever 66. The regulator 50 further comprises a regulator valve which is based on a regulator spring 62, a diaphragm 64 and the blocking lever 66. The diaphragm 64 is connected to the regulator spring 62 on one side and the blocking lever 66 on the other. The length of the blocking lever 66 and the force of the regulator spring 62 are balanced such that the blocking lever 66 blocks the regulator opening 54 partially and only enough gas to uphold the output-pressure p in the regulator outlet 54 is let through the regulator opening 54. If the pressure in the regulator outlet 52 rises above the output-pressure p, the gas will press against the diaphragm 64 and work against the spring force of the regulator spring 62. This will in turn move the blocking lever 64, which is also connected to the diaphragm 66, in such a way that the regulator opening 54 is more closed, and less gas can stream through the regulator opening 54, thereby decreasing the pressure in the regulator outlet 52. If the pressure in the regulator outlet 52 is below the output pressure p, the press of the gas on the diaphragm 64 is lessened, and the spring force will move the diaphragm 64 and in turn the blocking lever 66, such that the regulator opening 54 is blocked less, whereby more gas can stream through to the regulator outlet 54, thereby increasing the pressure. Through this regulator valve, the regulator 50 maintains a steady output pressure p. The uncertainty on the output pressure p depends on the tolerance of the specific regulator, and the properties of the gas and will range from +5 mbar to +50 mbar.

Figure 3:
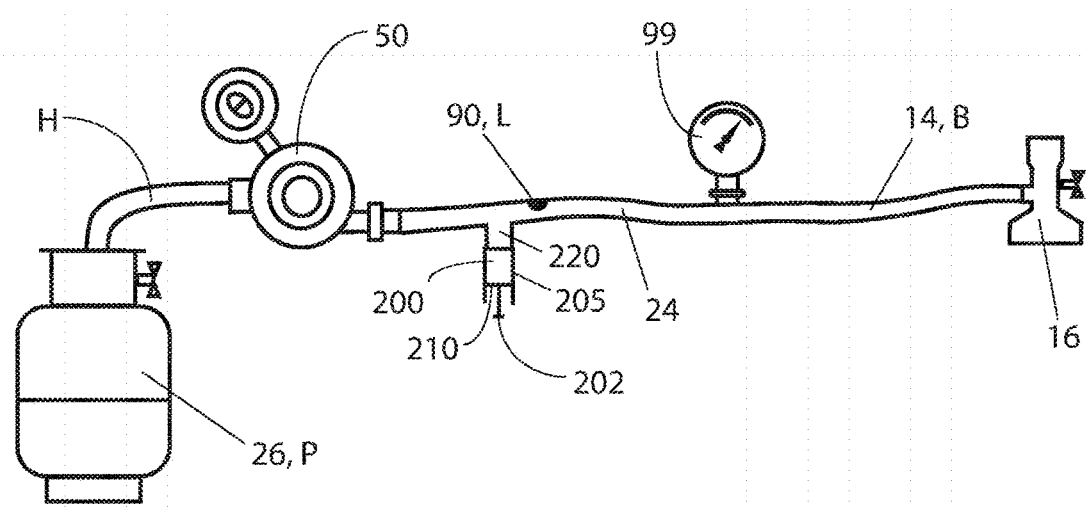
FIG. 3 shows a gas system with a pressure lock.

FIG. 3 shows a gas system 1 with a leak 90, where the gas leak detector 99 is a manometer.

The pressure lock 200 blocks the flow of gas through the regulator 50, as the applied lock-up pressure B exceeds the predetermined output pressure p so that the regulator valve closes. The closing of the regulator valve happens as the lock-up pressure B moves the diaphragm 64 (see FIG. 2) upwards thereby compressing the regulator spring 62 (see FIG. 2) and moving the blocking lever 66 (see FIG. 2) such that the regulator opening 54 (see FIG. 2) is blocked. The blocking lever 66 (see FIG. 2) itself is constructed so that it too offers flexibility and can function as a spring. Hence, a large lock-up pressure B may compress the spring 62 (see FIG. 2) and cause the blocking lever 66 to flex once the end of the blocking lever 66 (see FIG. 2) is in contact with and closing off the regulator opening 54 (see FIG. 2). Thus, in a system with no leak 90, by using the pressure lock 200 to introduce a lock-up pressure B, the temporarily increased pressure of the gas system 1 is the same on the supply side 20 and the consumption side 10. If there is a leak 90 present in the gas system 1, as shown in FIG. 3, the gas will escape through said leak 90 lowering the pressure on that side to the leak pressure L. Thus, a leak 90 in the gas system 1 may be detected as a decrease of the pressure, while the pressure lock is active. Once the lock-up pressure B has dwindled and the gas system downstream of the regulator 50 is at the predetermined output pressure p (see FIG. 2), the regulator 50 will no longer be locked, but will once again ensure function to keep a stable predetermined output pressure p in the system.

With the pressure lock 200, leak detection can take place immediately, and it is not necessary to turn off the gas supply 26 at the supply activation 22. As the added gas escapes through a potential leak 90, the pressure in the consumption conduit 14 and the supply conduit 24 will decrease. If the gas leak detector 99 is a manometer, the leak 90 will be detected as a decrease in the pressure. If the gas leak detector 99 is a bubble detector, it is the movement of gas as it goes towards the leak which will be detectable as visible bubbles inside the gas leak detector 99. When the pressure is once more below the predefined output pressure p, the regulator valve will open the flow of gas through the regulator opening 54 (see FIG. 2), and leak detection can no longer take place. Leak detection based on a lock-up pressure B from the pressure lock 200 can take place for a period of time depending on the amount of lock-up pressure B created by the pressure lock 200, i.e. how much the gas in the system is compressed. It will also depend on the size of the leak 90 as a larger opening will allow the gas to escape the gas system 1 at a higher flow rate. In an ideal system with no form of leak, the lock-up pressure B will be maintained until the gas consumer 16 is activated and allows the flow of gas out of the system The amount of lock-up pressure B applied to the gas system 1 depends on the volume of gas the pressure lock 200 compresses upon activation and the length of the gas system 1, i.e. how big a volume of gas can be contained within the gas system 1 which depends on the length of the tubing of the supply 24 and consumption conduit 14. In an embodiment of the invention, the pressure lock 200 has a volume of compression of 5-100 ml of gas. Size of the volume of compression for the pressure lock 200 can be varied between embodiments of the invention to be customised for the type of gas and the gas volume of the full gas system 1, i.e. the lengths and size of tubing in the gas system 1. The gas compression provided by the pressure lock 200 may be varied by the dimensions of the pressure lock, e.g. the volume of the pressure lock itself and the travelling distance of the activation means 210 in the case of a piston. In a preferred embodiment, the pressure lock 200 has a volume for compression of 5-25 ml. With a small compression volume in the pressure lock 200, e.g. around 15 ml, the directional gas leak detector 100 will be capable of detecting a leak in a gas system 1 with 1.5 m of tubing with an inner diameter of 10 mm for approximately a minute. By compressing a larger volume of gas with the pressure lock 200, the period of time in which gas leak detection can take place can be extended.

The pressure lock 200 may compress a volume of gas in the gas system 1 (see FIG. 1) through any activation means 210. For example, the activation means 210 could be a manual hand-pump, e.g. a piston pump, a plunger pump or a diaphragm pump, or it could be an electric pump, or a can of compressed gas which increases the pressure in the gas system by providing additional gas from a different source than the gas supply 26 (see FIG. 3).

Figure 4A:
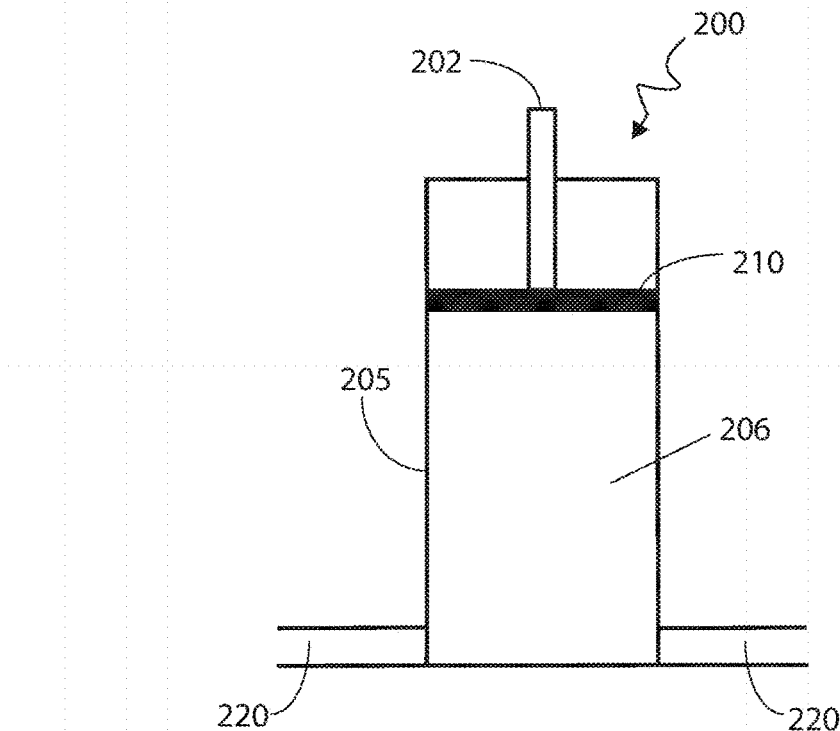
FIG. 4a illustrates an embodiment of a pressure lock including a pressure lock activator and activation means.
Figure 4B:
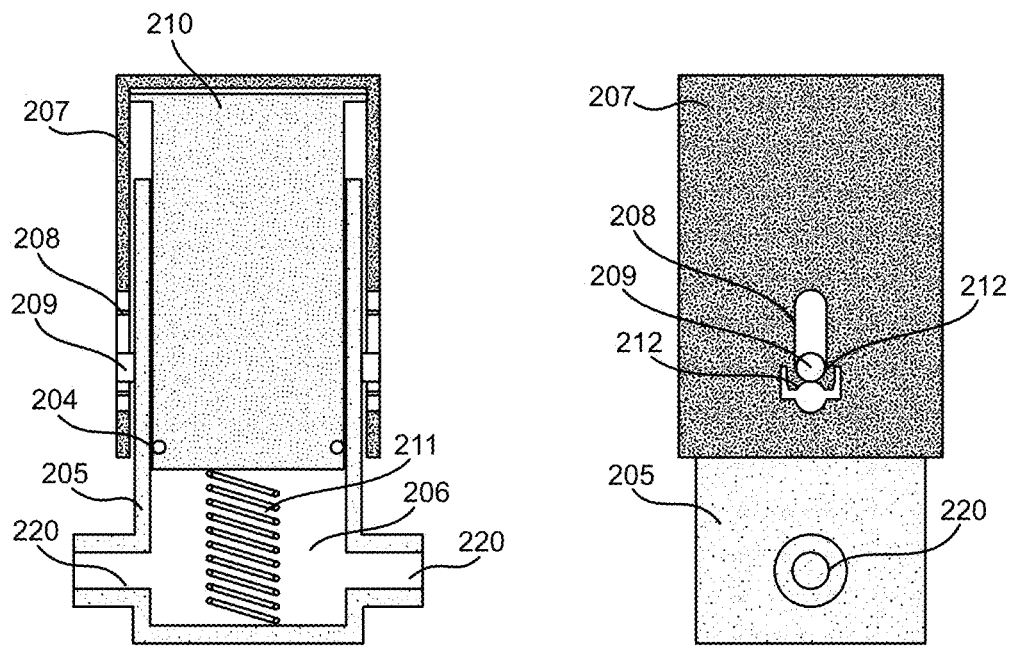
FIG. 4b illustrates in cross-sectional and side views an embodiment of a pressure lock including a piston a lid and resilient means in a resting position.

In FIG. 4a and FIG. 4b, embodiments of the pressure lock 200 in the form of a piston pump are illustrated in a cross-sectional view. The pressure lock 200 comprises a pressure lock body 205. In this pressure lock body 205, there is a lock chamber 206 in which a volume of gas can be contained. The lock chamber 206 can be connected to the gas system 1 (see FIG. 3) through lock connection means 220 such as a threaded connector, a tap connector or a valve. When the pressure lock 200 is connected to the conduits 14,24 (see FIG. 1) of the gas system 1 by the lock connection means 220, gas can flow from the gas system into the lock chamber 206. In an embodiment of the invention the pressure lock 200 comprises a single lock connection means 220, and the lock is attached to a conduit 14,24 of the gas system 1 (see FIG. 1) at a single point. In another embodiment, the pressure lock 200 comprises two lock connection means 220 connected to conduits 14,24, whereby the gas of the gas system 1 may pass through the lock chamber 206 when moving from the gas supply 26 to the gas consumer 16 (see FIG. 1).

The pressure lock 200 further comprises activation means 210 for delivering gas from the lock chamber 206 of the pressure lock body 205 into the remainder gas system 1. In the embodiments illustrated in FIG. 4a and FIGS. 4b-4c, the activation means 210 takes the form of a piston which displaces the gas in the lock chamber by pressing it through the connection means 220 and into the remainder of the gas system 1 thereby increasing the volume of gas in the gas system 1 and increasing the pressure of the gas system 1 to a lock-up pressure (B). To maintain a raised pressure of the gas system 1, the activation means 210 remains in a position, where the lock chamber 206 is blocked off from the gas system 1 thereby effectively decreasing the volume of the gas system 1 and compressing the gas within the closed off system and thus increasing the pressure to the lock-up pressure. The activation means 210 is thus constructed such that no significant leak of gas can take place around the activation means 210, e.g. around the piston in FIG. 4. This can for example be done by including a seal 204, such as a gasket around the activation means 210 in the pressure lock 200.

The pressure lock 200 further comprises a pressure lock activator 202 that allows the user to determine, when the activation means 210 is engaged and the lock-up pressure (B) is applied to the gas system 1. In a preferred embodiment, the pressure lock 200 is activated manually through a pressure lock activator 202 such as a button or a turn-knob for opening a valve or the handle or button of a piston system or pump. As illustrated in FIG. 4a, the pressure lock activator 202 may be a handle or back-end of a piston such that the activation means 210 is manually moved by the user when activating the pressure lock 200.

Figure 4C:
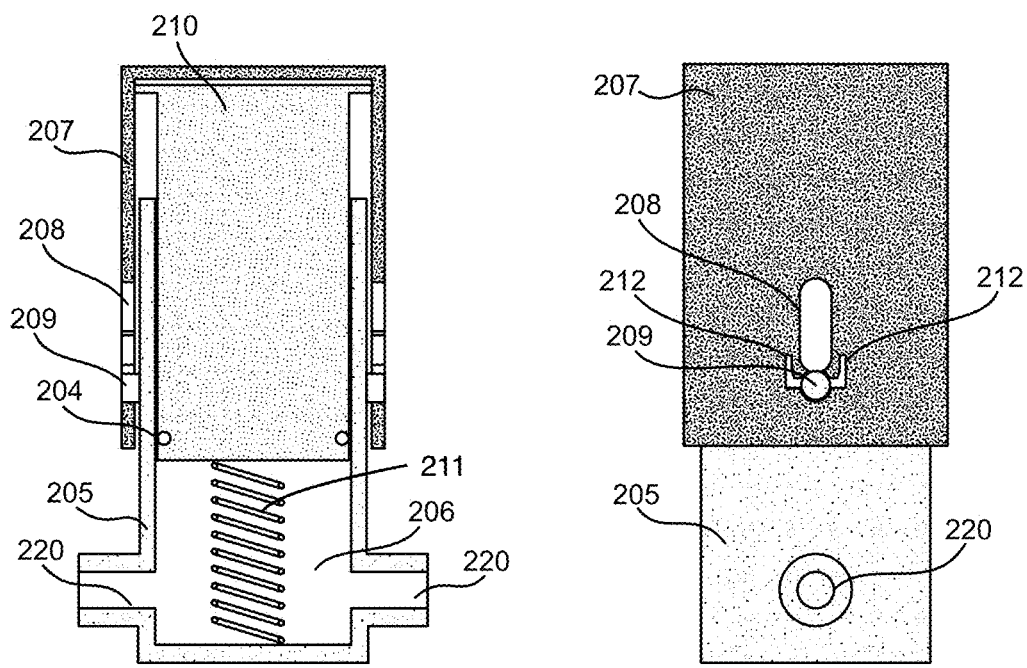
FIG. 4c illustrates in cross-sectional and side views an embodiment of a pressure lock including a piston a lid and resilient means in an extended, overpressure position.

FIGS. 4b-4c depict a second embodiment of a pressure lock 200 whereby the pressure lock activator 202 is integrated with the pressure lock activation means 210. Said embodiment further comprises a spring 211, which pushes the piston up to its resting position, e.g., after the activation means 210 is has been activated by the piston being pressed down, and a lid 207. Said lid 207 comprises at least one track 208 and a snap element 212. The at least one snap element 212 causes a narrowing in track 208. Thus, when the pressure lock activation means 210 is in the resting position, gas from the regulator side enters one side of the unit 220 and runs out to the appliance that is to use gas through the outlet 220. The spring 211 pushes the piston 210 and lid 207 up to the disengaged position after testing. Here the lid is stopped by a lid stop 209 integral to body 205 when interacting with the snap 212 in the groove 208 in the lid 207. In the event that e.g. a defective regulator causes the pressure to rise in the chamber 206, this will give increased pressure on the activation means, pushing up the piston 210 and thereby the lid 207. When the pressure reaches a certain size (e.g. 100 mbar) the snap element 212 will give way, and the piston 210 and lid 207 will be lifted up to the upper, overpressure position where the snap will again hold the lid stop in place so that the lid does not slide down again. Thus, the position of the lid will indicate that at some point there has been increased pressure in the system, and that the operator should check, e.g., the defective regulator. By pressing the lid, the lid clicks back into the disengaged, resting position. The strength of the snap 212 can be adjusted by adjusting the thickness of, or the material used for manufacturing the snap 212. Thereby, the pressure at which the snap is to be released can be adjusted.

Other embodiment of the pressure lock may take different forms, such as a diaphragm pump. In other embodiments, it is not the gas of the gas system 1 coming from the gas supply 26 (see FIG. 1) which the pressure lock 200 displaces into the gas system 1, rather it may be air surrounding the gas system 1 which is supplied to increase the pressure in the gas system 1. In another embodiment, the pressure lock may be a can of compressed gas connected to the gas system 1 through a lock connection means, and the activation of the pressure lock takes place, when a user engages the pressure lock activator 202 in the form of a button which supplies the compressed gas into the gas system 1 through the lock connection means 220. In such an embodiment, the activation means is the gas released from the can of compressed gas.

Using the pressure lock 200 enables a quick leak detection as an equalised lock-up pressure B is introduced in the system allowing small changes in the pressure to be detectable through the means of the gas leak detector 99. This enables a leak test to be made within the span of about a minute and makes it easy for the user to ascertain that he has monitored the gas system and gas leak detector 99 at the right time within which a leak 90 would be detected. Furthermore, the pressure lock 200 enables detection of leaks 90 in the system while the gas supply 26 has not been turned off on the supply activation 22, as the regulator valve is effectively locked regardless of the pressure in the high-pressure region 30 (see FIG. 1).

In some gas systems 1, the pressure lock 200 is mounted separately from the gas leak detector 99. In another embodiment, the pressure lock 200 is an integrated part of the gas leak detector 99.

Figure 5A:
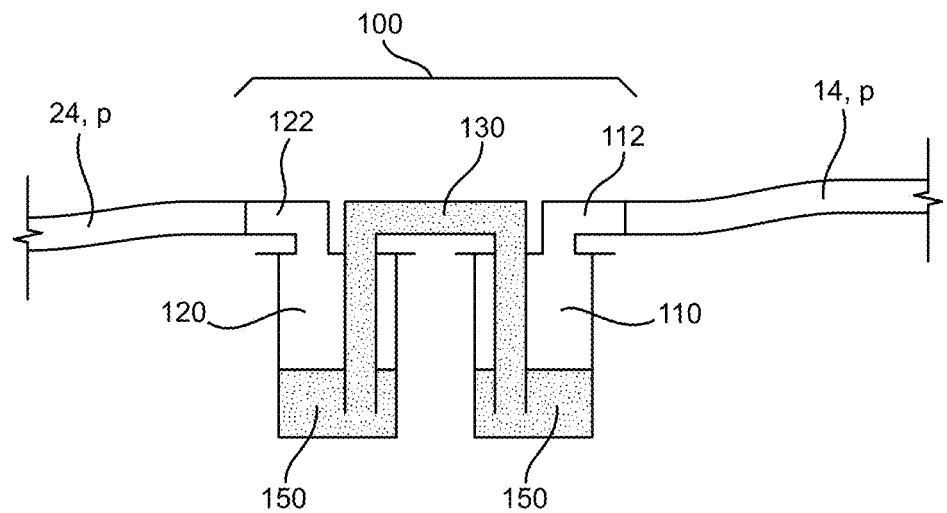
FIGS. 5a-5c are schematic drawings of the working principles of a directional gas leak detector in a cut-out of the gas system.
Figure 5B:
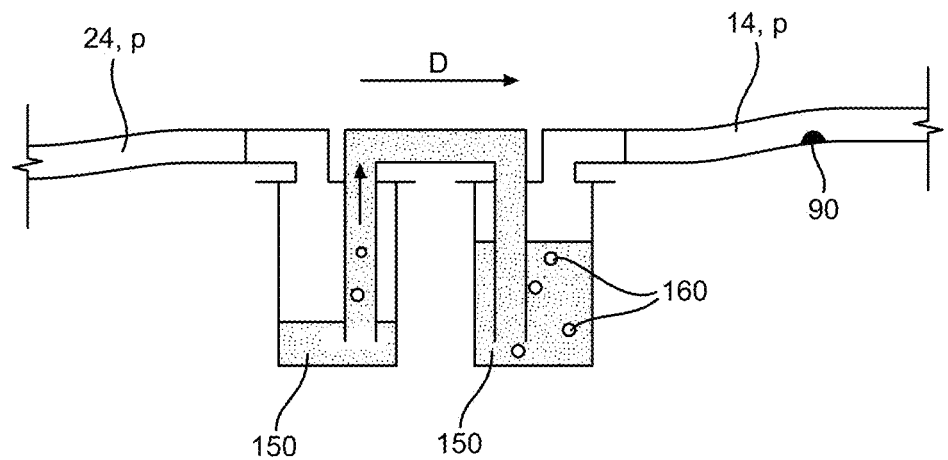
Figure 5C:
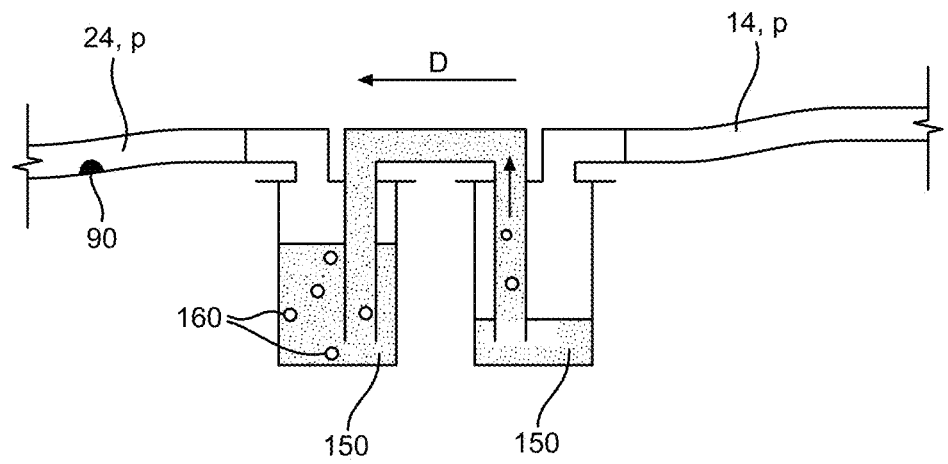

The pressure lock 200 provides a particular benefit when used in a system with a directional gas leak detector 100, the working principle of which is illustrated in FIGS. 5*a*-5*c* which illustrate the functioning principle of a directional gas leak detector 100 which may be used in combination with the pressure lock 200 to allow fast detection of the location of a gas leak. The directional gas leak detector 100 may be installed in a gas system 1 and the gas leak detector 99 and has the benefit that it indicates on which side of the directional gas leak detector 100 a leak 90 is present. However, the directional gas leak detector 100 would have the same problem of detection time as other gas leak detectors 99 when installed in a gas system 1 with a regulator 50 maintaining a predetermined output pressure p as long as possible.

FIG. 5*a* shows a directional gas leak detector 100 installed in the gas system 1, where there is no leak. The directional gas leak detector 100 comprises a first chamber 110 and a second chamber 120. The first 110 and second chambers 120 are joined by a gas bridge 130 that allows the exchange of fluids between the first 110 and second chambers 120. The gas bridge 130 is located below the surface level of the liquid 150 such that there is a liquid connection between the first 110 and second chambers 120, and gas passing between the first 110 and second chambers 120 must pass through the liquid 150 to do so, i.e. the gas bridge is placed low in the directional gas leak detector 100 with respect to gravity. In an embodiment of the invention, the gas bridge 130 connects the bottom half of the first chamber 110 to the bottom half of the second chamber 120, where bottom is considered the lowest point with respect to gravity, i.e. an item affected by gravity will tend to fall from the top towards the bottom, when the directional gas leak detector 100 is installed for use in the gas system 1 (see FIGS. 1 and 3). Furthermore, the directional gas leak detector 100 has a first chamber connector 112 for providing a fluidic connection between the first chamber 110 and one side of the gas system 1, i.e. either the consumption side 10 or the supply side 20. The first chamber connector 112 may be connected directly to the first chamber 110 or be connected through an additional structure which does not hinder the flow of gas to the first chamber 110. The directional gas leak detector 100 further has a second chamber connector 122 for providing a fluidic connection between the second chamber 120 and the other side of the gas system 1. The second chamber connector 122 may be connected directly to the second chamber 120 or be connected through an additional structure which does not hinder the flow of gas to the second chamber 120. In an embodiment of the invention, the directional gas leak detector 100 is constructed symmetrically such that it does not matter which connector faces which side of the gas system 1, i.e. the consumption side 10 or the supply side 20.

The first 112 and second chamber connector 122 are any means for attaching the directional gas leak detector 100 to the gas system 1, and they may take any suitable form which may vary for different embodiments suited for mounting in different systems. The connection means 112,122 may for example be threaded for connection with another connector piece either on the conduits 14, 24 or for connection directly to the gas consumer 16 or the regulator 50. In other embodiments, the connectors 112, 122 may be a nozzle that can be wedged directly into the opening of a conduit 12, 24 in the form of a tube. Various national standards exist for gas system connection means, and the present invention should not be seen as limited to only some connection means as the working principle of the invention is unaffected by the specific form of the connection means 112,122, and variants adapted to connect with local connection means standards are foreseen. Similarly, the suitable connection means 112, 122 may vary depending on the specific type of gas system, i.e. if it is a heating system, a system of cooking, etc. In some embodiments of the invention, the first chamber connector 112 and the second chamber connector 122 may be of the same type. In other embodiments of the invention, they may be different types of connectors.

When the directional gas leak detector 100 is installed for operation, the gas bridge 130 is completely filled with a liquid 150. [the] The first 110 and second chambers 120 are filled partially with the same liquid 150. This liquid helps visualise any pressure difference in the gas system 1 caused by a leak 90. In the case shown in FIG. 2*a*, there is no leak 90, so the pressures in the consumption conduit 14 (see FIG. 1) and the supply conduit 24 (see FIG. 1) are equivalent, and the liquid levels in the first 110 and second chambers 120 are the same.

FIG. 5*b* shows the directional gas leak detector 100 installed in the gas system 1 (see FIGS. 1 and 3), where there is a leak 90 on the consumption side 10 (see FIG. 1) in the consumption conduit 14. When the supply activation 22 (see FIG. 1) is shut off, and the excess pressure built up on the pressure side is equalised with the system, the pressure on the consumption side 10 (see FIG. 1) will remain lower due to the leak 90. In this situation, the output pressure p on the supply side 20 (see FIG. 1), e.g. inside the supply conduit 24, is higher than the leak pressure L on the consumption side 10 (see FIG. 1) including the leak pressure L in the consumption conduit 14. This pressure difference leads to a shift in the level of the liquid 90 in the first 110 and second chambers 120 causing the level to be higher in the first chamber 110, i.e. the chamber which is closest to the leak 90 which is in this case on the consumption side 10 (see FIG. 1) in the consumption conduit 14. Note that the shift in liquid level is not to scale just like the rest of the sketch. Furthermore, bubbles 160 will form, as gas on the supply side 20 (see FIG. 1) will move towards the leak 90 located on the opposite side on of the directional gas leak detector 100, i.e. the consumption side 10. In other words, gas will move from the supply conduit 24 through the directional gas leak detector 100 to the consumption conduit 14, as the pressure p in the supply conduit 24 is higher than the leak pressure L in the consumption conduit 14. This movement of gas leads to formation of bubbles 160 in the liquid 150. Hence, the formation of bubbles 160 is a visual indication of the presence of a leak 90 and the direction D, in which the bubbles 160 move, is an indication of the side of the directional gas leak detector 100 on which the leak 90 is located, as the bubbles 160 move towards the leak 90. Hence, the directional gas leak detector 100 can identify the presence of a leak 90 and on which side of the gas system 1 (see FIG. 1) it is located, thereby assisting the user in locating the leak and preventing any further leakage of gas.

FIG. 5c shows the directional gas leak detector 100 installed in the gas system 1, where there is a leak 90 in the supply conduit 24 on the supply side 20 (see FIG. 1). If there is no pressure lock 200 in the gas system 1, the supply activation 22 (see FIG. 1) must be shut off and the excess pressure built-up in the high-pressure region 30 (see FIG. 1) is slowly equalised with the remainder of the gas system 1. The pressure on the supply side 20 (see FIG. 1) including the supply conduit 24 will have a leak pressure L lower than the output pressure p due to the leak 90. In this situation, the output pressure p on the consumption side 10 (see FIG. 1) including the consumption conduit 14 is higher than the leak pressure L on the supply side 20 (see FIG. 1). This pressure difference leads to a shift in the level of the liquid 150 in the first 110 and second chambers 120, causing the level to be higher in the second chamber 120, i.e. the chamber which is closest to the leak 90 which is in this case on the supply side 20 (see FIG. 1) in the supply conduit 24. Furthermore, bubbles 160 will form, as gas on the consumption side 10 (see FIG. 1) moves towards the leak 90 located on the opposite side of the direction gas leak detector 100, i.e. in the supply conduit 24 on the supply side 20 (see FIG. 1). Hence, the formation of bubbles 160 is a visual indication of the presence of a leak 90, and the direction D, in which the bubbles 160 move, is an indication of side of the directional gas leak detector 100 on which the leak 90 is located, as the bubbles 160 move towards the leak 90. Hence, the directional gas leak detector 100 can identify the presence of a leak 90 and on which side of the gas system 1 (see FIG. 1) it is located, thereby assisting the user in locating the leak 90 and preventing any further leakage of gas.

If a leak 90 is present on the consumption side 10 of the gas system 1 (see FIG. 1), e.g. because of a loose connection or due to a hole in the consumption conduit 14, bubbles 160 will be visible immediately in the directional gas leak detector 100. This is the case because the leak pressure L on the consumption side 10 (see FIG. 1) will be lower than the output pressure p on the supply side 20 (see FIG. 1).

If a leak 90 is present on the supply side 20 (see FIG. 1), e.g. because of a loose connection or due to a hole in the supply conduit 24, detecting the leak 90 can only be done once the pressure of the gas system 1 has stabilised. Thus, if there [is] were no pressure lock 200 in the gas system 1 (see FIG. 1), the gas supply 26 (see FIG. 1) must be closed off from the rest of the gas system 1 through use of the supply activation 22 (see FIG. 1), so that no additional gas is being supplied to the gas system 1. Similarly, the consumer activation 12 (see FIG. 1) must be shut off such that the gas system 1 is closed off from the surrounding environment aside from any potential leaks 90 (see FIGS. 5b-5c). Once the gas system 1 is closed off from supply and consumption of gas, there will initially be an excess pressure H in the high-pressure region 30 (see FIG. 1) of the gas system 1, i.e. between the gas supply 26 and the regulator 50 (see FIG. 1). Initially, this excess pressure H may be around 0.3-16 bars and will thus initially be orders of magnitude larger than the output pressure p. The regulator would continue to let gas through from the high-pressure region 30 (see FIG. 1) to the rest of the gas system 1 as long as the excess pressure H in the high-pressure region 30 is larger than the predetermined output pressure p. As the directional gas leak detector 100 relies on the detection of a pressure difference to determine if there is a leak 90 (see FIG. 3) in the gas system 1, the leak detection might not take place until the excess pressure H has been lowered to the same level as the pressure in the supply conduit 24, i.e. either the output pressure p or the leak pressure L. Thus, a pressure-equalising time, where the excess pressure H dwindles to the same pressure as the pre-set output pressure p, must take place before a leak 90 on the supply side 20 (see FIG. 3) can be detected. Hence, it might take several minutes, e.g. 5-20 minutes, before the directional gas leak detector 100 could provide a reading on whether a leak 90 is present on the supply side 20.

Therefore, a directional gas leak detector 100 (FIGS. 5a-5c) benefits from the presence of a pressure lock 200 which makes the directional gas leak detector 100 capable of detecting the presence of a leak 90 (see FIGS. 5b-5c) on either side of the system 10,20 (see FIG. 1) within a short timeframe of less than a couple of minutes. The pressure lock blocks the regulator valve and ensures an equal lock-up pressure B on both sides of the system 10,20, if there is no leak 90 present. If there is a leak 90 present in the system, the leak pressure L will be lower on the side of the leak 90 than the lock-up pressure B on the leak-free side of the gas system 1. Hence bubbles 160 (see FIGS. 5b-5c) will immediately form in the directional gas leak detector 100, and a leak 90 and its position in the system can be identified.

Figure 6A:
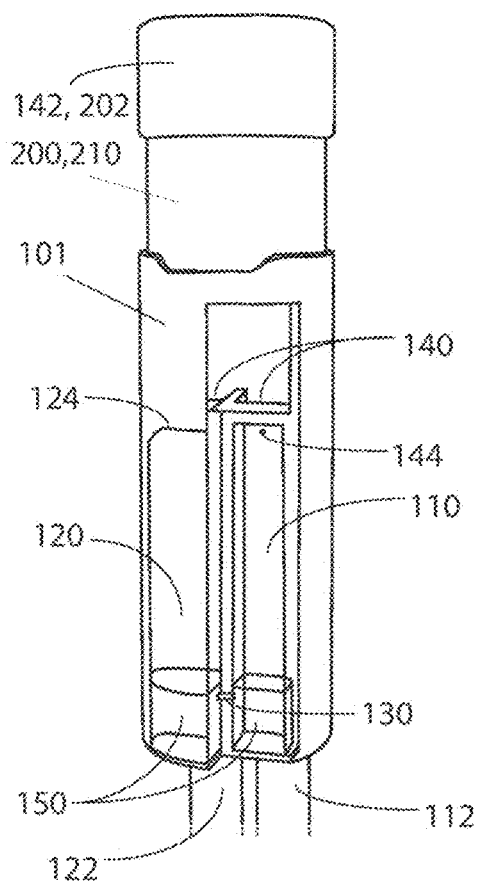
FIGS. 6a-6b show an embodiment of the directional gas leak detector in a compact construction with an integrated bypass and a pressure lock, illustrated in partial cross-sectional view.
Figure 6B:
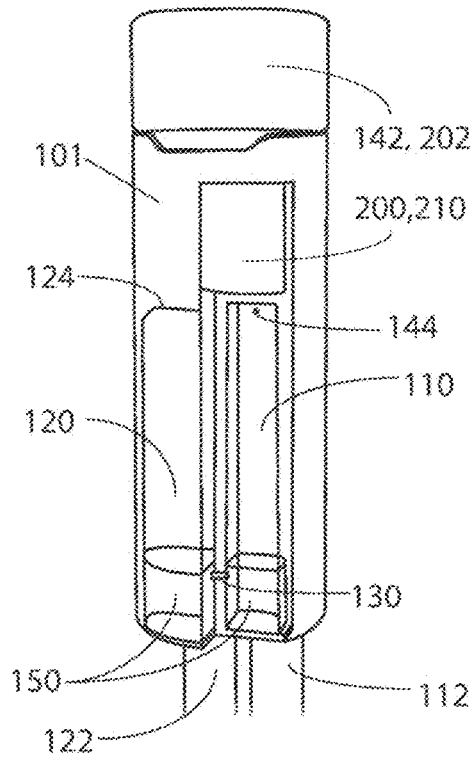

FIGS. 6a and 6b show a partial cross section of an embodiment of the pressure lock 200 integrated in a directional gas leak detector 100. On the side of the second chamber 120, the full structure is shown including a second window 124 which may be made of any transparent material allowing the user visual access to the second chamber 120 which is necessary when determining a leak based on the presence of bubbles 160 in the liquid 150. The first chamber 110 will also be equipped with a first window 114, but this is not shown in FIGS. 6a and 6b, as the first chamber 110 side of the directional gas leak detector 100 is shown in a cross-sectional view to show the structure above the first chamber 110 too.

In embodiments of the directional gas leak detector 100, it comprises a bypass channel 140 that allows the gas system 1 to operate normally while the directional gas leak detector 100 is installed in the system. In the structure shown in FIGS. 6a and 6b, the bypass channel 140 is an open volume connecting the first 110 and second chambers 120. When the directional gas leak detector 100 is not engaged, the consumption conduit 14 and the supply conduit 24 are connected through the bypass channel 140, and the directional gas leak detector 100 does not influence the gas system 1 (see FIG. 1). In the embodiment shown in FIGS. 6a and 6b, some gas may still enter the first 110 and second chamber 120 through the first test channel 144 and the second test channel 145 (not shown) while bypassing the test system. However, by constructing the bypass channel 140 to be larger than the first 144 and second test channel 145, the bypass channel 140 offers less resistance, and the gas will primarily pass through the directional gas leak detector 100 via the bypass channel 140 as long as it is open.

When a leak test is to be made, the bypass channel 140 is blocked by the test activation means 142, thereby forcing any gas moving between the consumption side 10 and the supply side 20 of the system to move through the first 144 and second 145 test channel into the first 110 and second chambers 120 and pass through the gas bridge 130 between the first 110 and second chambers 120 and hence also through the liquid 150. Thereby, bubbles 160 that can be detected by the user are created, if there is a pressure difference between the sides of the directional gas leak detector 100 causing the gas to move across said directional gas leak detector 100.

When a leak test is to be made, the test activation means 142 is engaged, and the bypass channel 140 is closed, whereby the gas is directed through the first 110 and second chambers 120 and the gas bridge 130 between them. In an embodiment of the invention, the test activation means 142 must be engaged by the user throughout the span of the test, e.g. being a button that is held down during the test or a mechanism that is rotated and held in place. In another embodiment of the invention, the test activation means 142 can be locked in place, so that the user does not need to apply any force to it during the test itself. In such an embodiment, where the test activation means 142 can be locked in place, the user will have to release the test activation means 142 manually once the test is done, and bypass mode is once more desired.

The pressure lock 200 is integrated in the gas detector 99. In this embodiment, the test activation means 142, the pressure lock activator 202, and the activation means 210 are all combined in one part taking the form of a small piston pump which compresses the gas in the volume above the first 110 and second chambers 120 of the directional gas leak detector 100, thereby creating the lock-up pressure B. At the same time, the piston of the pump functions as a test activation means 142, as the structure blocks the bypass channel 140, once it has been pressed to create the lock-up pressure B. Thus, the activation means 210 and test activation means are a structure fitting tightly inside the outer shell 101 of the directional gas leak detector 100 such that no or only very little gas may escape between the inside of the outer shell 101 and the outside of the structure of the activation means 210. In FIGS. 6a and 6b, the structures are cylindrical, but in other embodiments of the invention they may take other shapes. This integrated solution allows a compact construction, where the user needs only interact with a single unit to make a leak test, thereby simplifying the process and making it easy to perform a test in relation to every use of the gas system 1.

FIG. 6a shows the compact embodiment of the directional gas leak detector 100 in bypass-mode, where the bypass channel 140 is open before the combined test activation means 142 and pressure lock 200 have been engaged by the user. Assuming that the directional gas leak detector 100 is mounted in the system such that the second chamber connector 122 is connected to the supply conduit 24 and the first chamber connector 112 is connected to the consumption conduit 14, the gas will in bypass mode enter the directional gas leak detector 100 through the second chamber connector 122 and pass directly through the bypass channel 140 and out through the first chamber connector 112. The directional gas leak detector 100 may be installed oppositely, such that the first chamber connector 112 is connected to the supply conduit and will in that case function in the same manner.

FIG. 6b illustrates the situation, where a test-mode has been engaged and the bypass channel 140 is blocked by the test activation means 142. If there is a leak 90 on the consumption side 10, gas will move from the supply side 20 towards the leak 90. Thus, in test mode the gas will enter the directional gas leak detector 100 through the second chamber connector 122 and move towards the bypass channel 140, but as the bypass channel 140 is blocked, the gas will move through the second test channel 145 (not shown) into the second chamber 120 and through the gas bridge 130 into the first chamber 110. It is this movement of gas through the second 120 and first chambers 110 which will cause bubbles 160 to form and move through the liquid 150. The gas will exit the first chamber 110 through the first test channel 144 and continue out of the directional gas leak detector 100 through the first chamber connector 112 wherefrom it can move out of the system through the leak 90 placed on the consumption side 10.

In a preferred embodiment of the invention, the test activation means 142 is integrated with the activation means 210 of a pressure lock 200, such that a lock-up pressure B is created in the system, and detection of a leak takes place immediately.

Figure 7:
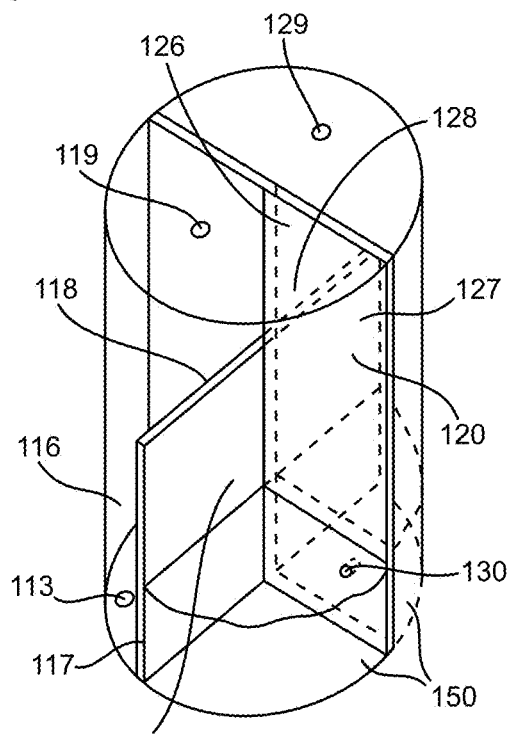
FIG. 7 illustrates a detector body with four chambers and the possibility of connecting gas inlets and gas outlets at either the top or bottom of the detector body.

In a preferred embodiment of the invention, the pressure lock 200 is used with or integrated with a directional gas leak detector 100 comprising four chambers. The working principle of and embodiments of such a directional gas leak detector 100 is shown in FIG. 7. It is shown in a semi-transparent perspective, where some lines in the background are dashed for easier distinction of the layers of the structure.

As in all other embodiments with a directional gas leak detector 100, the first 110 and second chambers 120 are fluidically connected only through the gas bridge 130 which is located below the surface of the liquid 150 in the first 110 and second chambers 120, respectively, i.e. the gas bridge is located low in the directional gas detector 100 with respect to gravity. Meanwhile the first chamber 110 is connected to the first back-chamber 116 through a first top opening 118, and the second chamber 120 is connected to the second back-chamber 126 through a second top opening 128. The top opening may be a gap above a first 117 and second back-chamber wall 127 as illustrated in FIG. 7, or it may be an opening or channel through the first 117 and second back-chamber walls 127, respectively. The first 118 and second top openings 128 need not be made in the same manner as long as they allow gas communicating between the first chamber 110 and first back-chamber 116 and the second chamber 120 and second back-chamber 126, respectively. In another embodiment of the invention the first chamber 110 does not need to share a wall with the first back-chamber 116. The chambers may be disconnected aside from through the top opening 118. The same is the case for the second chamber 120 and the second back-chamber 126. The first 118 and second top openings 128 are located gravitationally higher than the gas bridge 130, and the surface level of the liquid 150 is in both the first 110 and second chambers 120 above the gas bridge 130 and below the first 118 and second top openings 128, respectively. This ensures that gas can pass directly between the first back-chamber 116 and the first chamber 110 and between the second back-chamber 126 and the second chamber 120, respectively, but for gas to pass between the first 110 and second chamber 120 it has to pass through the liquid 150 to go through the gas bridge 130. The first back-chamber 116 and the second back-chamber 126 have no direct connection. This configuration of four chambers ensures that the liquid can be placed at the gravitational bottom of the first 110 and second chambers 120, while the first 112 and second chamber connectors 122 (see FIGS. 6a-6b) may be located either at the gravitational top or gravitational bottom of the directional gas detector 100 and be connected to the gas system 1 (see FIG. 1). The first chamber connector 112 (see FIGS. 6a-6b) will connect to the directional gas detector 100 either through the first bottom aperture 113 or through the first top aperture 119 depending on whether the first chamber connector 112 (see FIGS. 6a-6b) is above or below the first 110 and second chambers 112. Similarly, the second chamber connector 122 (see FIGS. 6a-6b) will connect to the directional gas detector 100 either through the second bottom aperture (not shown) or through the second top aperture 129 depending on whether the second chamber connector 112 (see FIGS. 6a-6b) is above or below the first 110 and second chambers 112.

This flexibility in the placement of the first 112 and second chamber connectors 122 (see FIGS. 6a-6b) allows versatility in the installation of the directional gas leak detector 100 in a gas system 1 which is important when it needs to be installed in a place with limited space, e.g. above or below the surface of a table or between cabinets. Ensuring that the directional gas leak detector 100 takes up little space and is easily accessible for the user increases the chance of it being installed and frequently used and thus also the safety that it provides.

The version of the directional gas leak detector 100 with four chambers may be integrated with the pressure lock 200 (see FIG. 4) in exactly the same manner as the directional gas leak detector 100 without two chambers, including e.g. a bypass channel 140 and shared test activation means 142 and pressure lock activator 202 which may in turn be integrated in the activation means 210.

What is claimed is:

1. A gas system (1) with a regulator (50), the system comprising:
   a pressure lock (200) comprising:
      a pressure lock body (205) to be fluidically connected in said gas system, whereby gas can pass from a lock chamber (206) in said body via lock connection means (220) to said gas system (1),
      activation means (210) for delivering gas from said pressure lock chamber (206) and into said gas system thereby providing a lock-up pressure (B), whereby the gas from said pressure lock body (205) provides an increased pressure in said gas system (1),
   a gas leak detector (99) being a directional gas leak detector (100) comprising:
      at least a first chamber (110) for holding liquid (150) and a second chamber (120) for holding the same liquid (150),
      a first chamber connector (112) providing a passage to said first chamber (110),
      a second chamber connector (122) providing a passage to said second chamber (120),
      said first (110) and second chambers (120) are connected by a gas bridge (130),
   wherein said pressure lock (200) is integrated with the gas leak detector (99) thereby ensuring rapid detection of a gas leak (90).

2. The gas system (1) according to claim 1, wherein activation means (210) is a piston driven by a pressure lock activator (202).

3. The gas system (1) according to claim 1, wherein said directional gas leak detector (100) comprises a first back-chamber (116) and a first top opening (118) connecting said first back-chamber (116) to said first chamber (110), and wherein said directional gas leak detector (100) further comprises a second back-chamber (126) and a second top opening (128) connecting said second back-chamber (126) to said second chamber (120).

4. The gas system (1) according to claim 1, wherein said directional gas leak detector (100) comprises a bypass channel (140) and a test activation means (142) for engaging and disengaging said bypass channel (140), said test activation means (142) being integrated with said pressure lock activator (202), whereby the bypass channel (140) is disengaged simultaneously with the lock-up pressure (B) being applied.

5. The gas system (1) according to claim 2, wherein the pressure lock activator (202) is integrated with the pressure lock activation means (210).

6. The gas system (1) according to claim 5 further comprising a resilient element (211), for pushing the pressure lock activator (202) and the pressure lock activation means (210) up to its resting position, and a lid (207).

7. The gas system (1) according to claim 6, wherein said lid (207) is arranged to engage the pressure lock activator (202) or the pressure lock activation means (210) by engagement of a lid stopper (209) in a track or groove (208).

8. The gas system (1) according to claim 7, wherein said track or groove (208) is comprised by the lid (207) and the lid stopper (209) is comprised by the pressure lock body (205).

9. The gas system (1) according to claim 7 wherein the lid stopper (209) is further adapted to engage a second resilient element (212).

10. The gas system (1) according to claim 9 wherein said second resilient element is a snap element (212).

11. A method for temporarily blocking a regulator (50) in a gas system (1), the method comprising:
   connecting a pressure lock (200) to a gas system (1) according to claim 1 through a lock connection means (220),
   ensuring that gas cannot exit the gas system (1) through an active gas consumer (16), and
   engaging a pressure lock activator (202), whereby an activation means (210) is activated, and a volume of gas inside a pressure lock body (205) is compressed, whereby the pressure of the gas system (1) is increased to a lock-up pressure (B) exceeding a predetermined output pressure (p) of the regulator (50).

12. The method of temporarily blocking a regulator in a gas system (1) according to claim 11, wherein gas leak detection takes place during the time in which said regulator (50) is blocked.

13. The method of temporarily blocking a regulator in a gas system (1) according to claim 11, wherein a bypass channel (140) is closed simultaneously with the activation of said pressure lock (200).

14. The method of temporarily blocking a regulator in a gas system (1) according to claim 11, wherein the method further comprises the step of directionally detecting a gas leak using a system as claimed in claim 1.

15. The method of temporarily blocking a regulator in a gas system (1) according to claim 11, wherein the method further comprises the step of disengaging the pressure lock activator (202), whereby a pressure activation means (210) is disactivated by means of a resilient means (211).

16. The method of temporarily blocking a regulator in a gas system (1) according to claim 14, wherein a position of the pressure lock activator (202) is secured by a second resilient means (212).

* * * * *